United States Patent
Mirabelli

(10) Patent No.: US 6,584,306 B2
(45) Date of Patent: *Jun. 24, 2003

(54) TWO-WAY RADIO WITH SILENT ANNUNCIATION

(75) Inventor: Anthony Mirabelli, Arlington Heights, IL (US)

(73) Assignee: Cobra Electronics Corporation, Chicago, IL (US)

(*) Notice: Subject to any disclaimer, the term of this patent is extended or adjusted under 35 U.S.C. 154(b) by 141 days.

This patent is subject to a terminal disclaimer.

(21) Appl. No.: 09/886,825

(22) Filed: Jun. 21, 2001

(65) Prior Publication Data

US 2001/0036819 A1 Nov. 1, 2001

Related U.S. Application Data

(62) Division of application No. 09/248,968, filed on Feb. 12, 1999, now Pat. No. 6,272,331.
(60) Provisional application No. 60/075,484, filed on Feb. 23, 1998.

(51) Int. Cl.⁷ .............................. H04B 1/38; H04M 1/00
(52) U.S. Cl. ........................ 455/347; 455/517; 455/567; 455/575
(58) Field of Search .................... 455/567, 90, 347, 455/517, 518, 519, 520, 521, 575

(56) References Cited

U.S. PATENT DOCUMENTS

| 5,263,195 A | | 11/1993 | Panther et al. |
| 5,311,570 A | | 5/1994 | Grimes et al. |
| 5,379,032 A | | 1/1995 | Foster et al. |
| 5,487,181 A | * | 1/1996 | Dailey et al. ............... 455/575 |
| 5,491,739 A | | 2/1996 | Wadin et al. |
| 5,574,772 A | | 11/1996 | Scalisi et al. |
| 5,613,209 A | | 3/1997 | Peterson et al. |
| 5,615,410 A | * | 3/1997 | DeMars ....................... 455/90 |
| 5,631,635 A | | 5/1997 | Robertson et al. |
| 5,651,051 A | | 7/1997 | Stuart |
| 5,689,807 A | | 11/1997 | Wong et al. |
| 5,706,331 A | | 1/1998 | Wang et al. |
| 5,708,422 A | | 1/1998 | Blonder et al. |
| 5,712,624 A | | 1/1998 | Ayerst et al. |
| 5,867,796 A | * | 2/1999 | Inutsuka ..................... 455/567 |
| 5,898,904 A | | 4/1999 | Wang |
| 5,926,756 A | | 7/1999 | Piosenka et al. |
| 6,094,565 A | * | 7/2000 | Alberth et al. ................ 455/90 |
| 6,272,331 B1 | * | 8/2001 | Mirabelli .................... 455/347 |

FOREIGN PATENT DOCUMENTS

| JP | 8237159 A | 2/1995 |
| WO | WO 99/43093 | 8/1999 |

* cited by examiner

*Primary Examiner*—Edward F. Urban
*Assistant Examiner*—Simon Nguyen
(74) *Attorney, Agent, or Firm*—Wallenstein & Wagner, Ltd.

(57) ABSTRACT

A point-to-point two-way radio system is disclosed. The two-way radio system is comprised of a first and second two-way handheld walkie-talkie radio, wherein the first and second two-way handheld walkie-talkies do not communicate one to the other through a base station. Each handheld walkie-talkie radio is comprised of a transmitter for transmitting a call announcement signal and a transmitter for transmitting a separate voice signal. The voice signal is different from the call announcement signal and is transmitted over a fixed frequency range. The handheld walkie-talkie also has a receiver for receiving the voice communication signal and call announcement signal and for announcing the call announcement signal and a switch for selectively choosing between an audible call announcement or a vibrational call announcement.

7 Claims, No Drawings

TWO-WAY RADIO WITH SILENT ANNUNCIATION

RELATED APPLICATION

This is a divisional application of U.S. patent application Ser. No. 09/248,968 filed Feb. 12, 1999 now U.S. Pat. No. 6,272,331 which claims the benefit of U.S. Provisional Application No. 60/075,484, filed Feb. 23, 1998.

TECHNICAL FIELD

The invention relates generally to the annunciation of incoming calls in a two-way radio system. More particularly, the present invention relates to a vibrating call notification in a two-way radio system.

BACKGROUND PRIOR ART

Two-way radios have become popular communication tools where phones or other communication methods are not cost effective or simply not efficient. These 2-way radios generally allow users to communicate with one another without experiencing interruptions caused by other users, such as the case with citizen band radios.

Early two-way radio systems relied on the voice of one of the users to call or gain the attention of a fellow user. As improvements were made to these systems, a call feature was added. The call feature would notify the user of an incoming communication by producing an audible tone.

In many instances, an audible tone is ineffective in getting the attention of the intended receiver. Since two-way radios are often used in environments such as construction sites where there is a great deal of noise, users often miss calls and important messages.

In other instances, the receiver may not want the audible tone to alert others of incoming messages. When the receiver is in a quiet area such as a library, church, movie, or other area where audible disturbances are unwelcome, the receiver would have to turn off the two-way radio or risk causing a disturbance.

Because audible annunciation methods in two-way radio communication systems are often undesirable, a need has developed for a method of alerting a two-way radio user of an incoming call which does not produce an audible tone.

SUMMARY OF THE INVENTION

The present invention provides a point-to-point two-way radio system is disclosed.

According to one aspect of the present invention, the two-way radio system is comprised of a first and second two-way handheld walkie-talkie radio, wherein the first and second two-way handheld walkie-talkies do not communicate one to the other through a base station. Each handheld walkie-talkie radio is comprised of a transmitter for transmitting a call announcement signal and a transmitter for transmitting a separate voice signal. The voice signal is different from the call announcement signal and is transmitted over a fixed frequency range. The handheld walkie-talkie also has a receiver for receiving the voice communication signal and call announcement signal and for announcing the call announcement signal and a switch for selectively choosing between an audible call announcement or a vibrational call announcement.

Other features and advantages of the invention will be apparent from the following specification.

DETAILED DESCRIPTION

While this invention is susceptible of embodiments in many different forms, there will herein be described in detail, a preferred embodiment of the invention with the understanding that the present disclosure is to be considered as an exemplification of the principles of the invention and is not intended to limit the broad aspects of the invention to the embodiment illustrated.

The present invention relates to a two-way radio communication system. The two-radio system comprises a plurality of handheld radios. The handheld radios are protected by a plastic housing. Most preferably, the housing measures 4 inches high, 2½ inches wide, and 1⅜ inches deep and includes a retractable antenna. Each handheld radio is equipped with a receiver and a transmitter. The receivers and transmitters operate over a fixed frequency range, preferably from 462.5 MHZ to 463.0 MHZ or any range or combination of ranges therein. This ultra high frequency range provides outstanding penetration and frequency modulation provides clear reception. Alternatively, the receivers and transmitters may operate over a fixed frequency range from 446.00625 MHZ to 446.09375 MHZ, specifically including the operating frequencies of 446.00625 MHZ, 446.01875 MHZ, 446.03125 MHZ, 446.04375 MHZ, 446.05625 MHZ, 446.06875 MHZ, 446.08125 MHZ, and 446.09375 MHZ, in accordance with the Private Mobile Radio (PMR) standards widely used in European countries. Signals are transmitted directly between or among other radios on the system, rather than via an intermediate carrier, such as is done by cellular telephones.

The radios are capable of delivering about 500 mW of radiated power. This provides maximum distance at full radiated power to deliver maximum range capabilities. Each radio has 14 user selectable channels for privacy. In the preferred embodiment, the radios include 38 additional private tone codes that provide 532 different channel combinations to insure a clear channel can be found. These 38 subcodes can be electronically scanned to locate active communications. The radios also include memory locations for storing the most frequently used channel/subcode combinations. Furthermore, each radio has a private call which is a special voice scrambling circuitry to further insure that communications remain private.

The radios further include a confirmation tone. The confirmation tone is an electronic, mechanical, or electromechanical sound that indicates the completion of one transmission and alerts another user to the fact that he/she may begin a transmission.

The radios generally operate on DC power. Accordingly, any source of DC power can be used. Preferably, four AAA alkaline batteries are used. Rechargeable nickel cadmium batteries may also be utilized as well as a cigarette lighter adaptor power cord connecting the radio to a vehicle battery.

A call feature to alert a user of an incoming message is also included in the radios. This call feature includes a push button which "rings" or notifies a user or users of an incoming communication. The notification means is normally an audible, electronic, mechanical, or electromechanical tone. However, in the present invention, a virtually silent notification means is present. This virtually silent notification means is a vibrational system which causes the radio housing to pulse. This vibrating or pulsing alerts the user that he/she has an incoming message. This relatively inaudible notification system allows the user to receive notifications in environments where an audible tone is undesirable, such as churches or meetings where disturbances are frowned upon or loud construction sites where audible tones cannot be heard.

Additional features that can be incorporated into the radios include, but are not limited to, charge ports for recharging the batteries, wrist straps for easy carrying, auto squelch for noise control, monitor control, liquid crystal displays, removable belt clips, speaker and microphone jacks, battery saver circuitry, and low battery indicators.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A point-to-point two-way radio system comprising:
    a first and second two-way handheld walkie-talkie radio, wherein the first and second two-way handheld walkie-talkies do not communicate one to the other through a base station, each handheld walkie-talkie radio comprising:
        a transmitter for transmitting a call announcement signal and for transmitting a separate voice signal, said voice signal being different from said call announcement signal and being transmitted over a fixed frequency range;
        a receiver for receiving the voice communication signal and call announcement signal and for announcing the call announcement signal;
        a vibrator responsive to the call announcement signal;
        an audible notification means responsive to the call announcement signal; and,
        a switch for selectively choosing between an audible call announcement or a vibrational call announcement.

2. The two-way radio system of claim 1 wherein the fixed frequency range is 462.5 MHZ to 463.0 MHZ.

3. The two-way radio system of claim 1 wherein the first and second handheld radios operate on DC power.

4. The two-way radio system of claim 3 wherein the first and second handheld radios operate on 4 AAA alkaline batteries.

5. The two-way radio system of claim 3 wherein the first and second handheld radios operate on a nickel cadmium battery.

6. The two-way radio system of claim 3 wherein one of the handheld radios operates on a vehicle battery.

7. The two-way radio system of claim 1 wherein the fixed frequency range is 446.00625 MHZ to 446.09375 MHZ.

* * * * *